March 16, 1965  B. WOODWARD, JR  3,173,463
METHOD OF PROCESSING APPLES
Original Filed Aug. 12, 1960  9 Sheets-Sheet 1

INVENTOR.
BERNARD WOODWARD JR.
BY Thomson & Schouse
ATTORNEYS

March 16, 1965  B. WOODWARD, JR  3,173,463
METHOD OF PROCESSING APPLES

Original Filed Aug. 12, 1960  9 Sheets-Sheet 4

INVENTOR.
BERNARD WOODWARD JR.

BY Thomson & Schouer

ATTORNEYS

March 16, 1965    B. WOODWARD, JR    3,173,463
METHOD OF PROCESSING APPLES
Original Filed Aug. 12, 1960    9 Sheets-Sheet 6

INVENTOR.
BERNARD WOODWARD JR.
BY *Thomson & Schoene*

ATTORNEYS

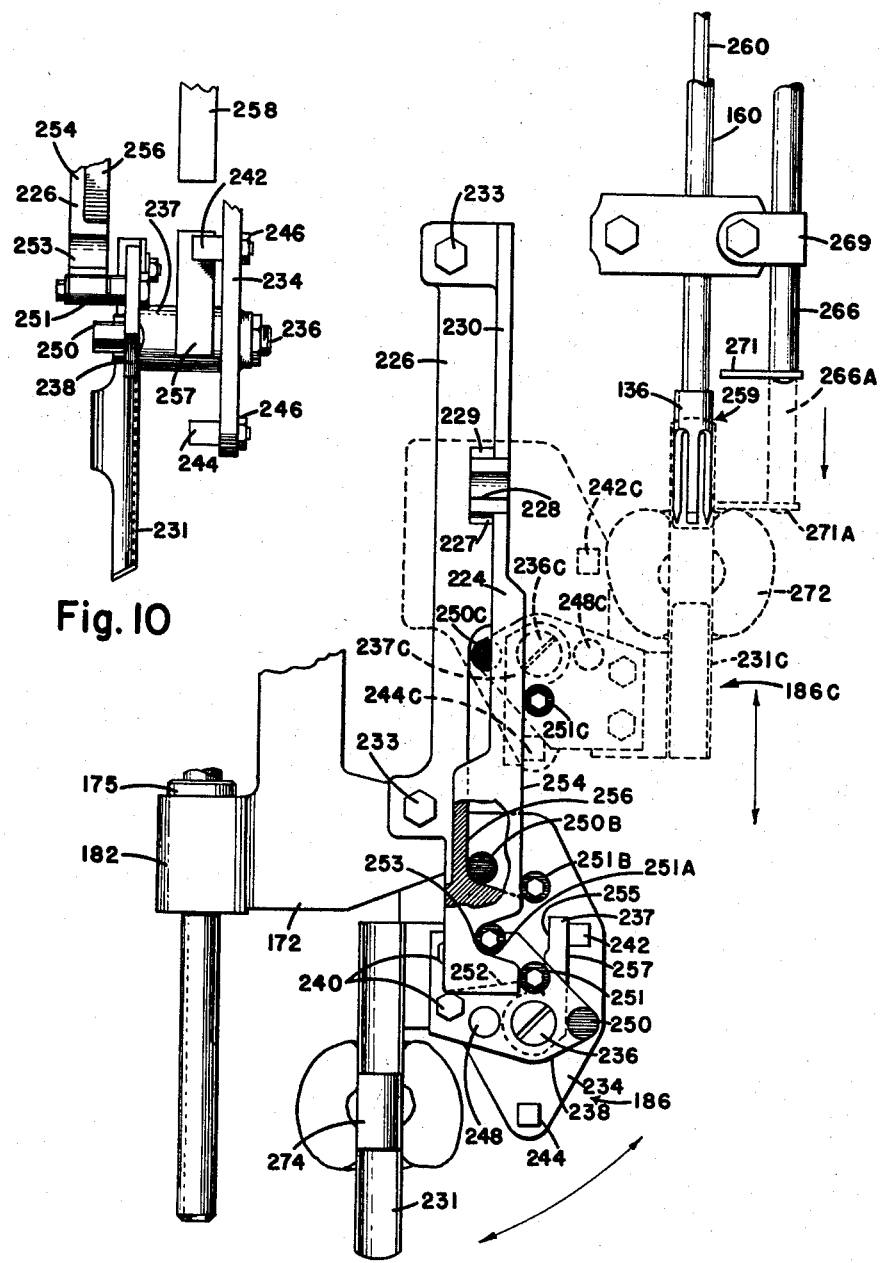

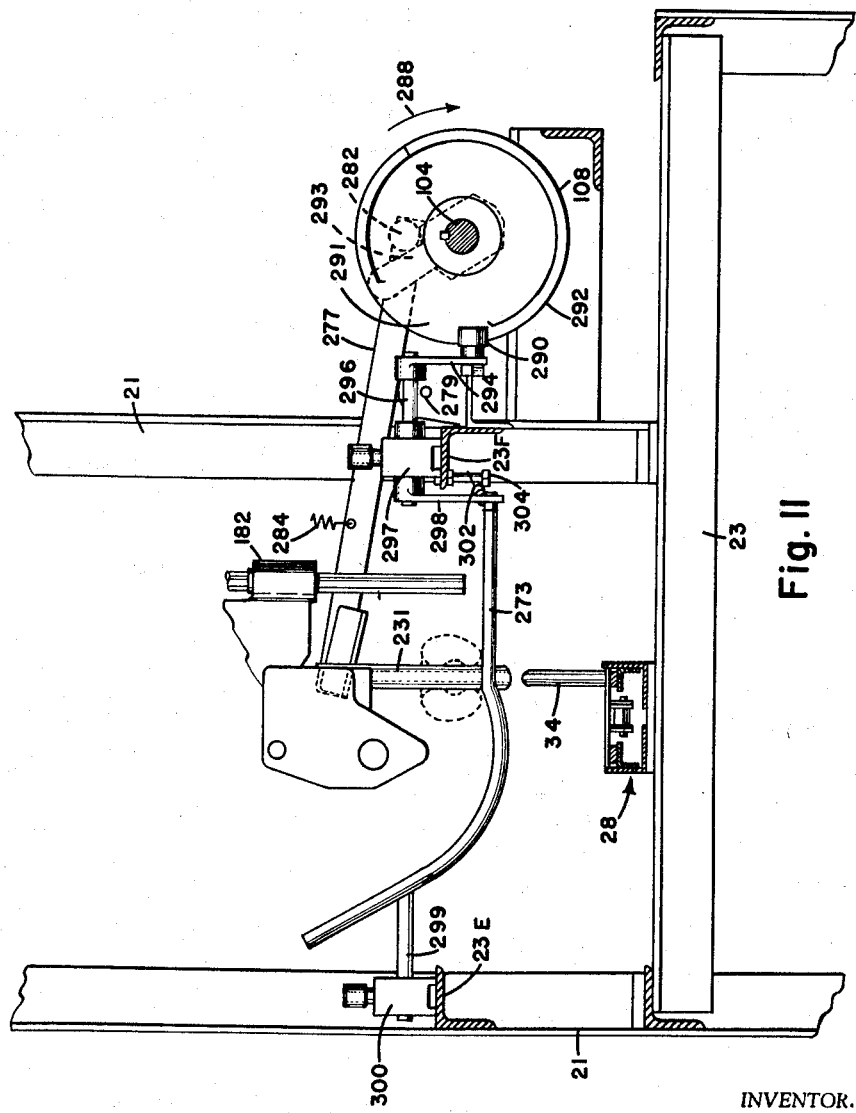

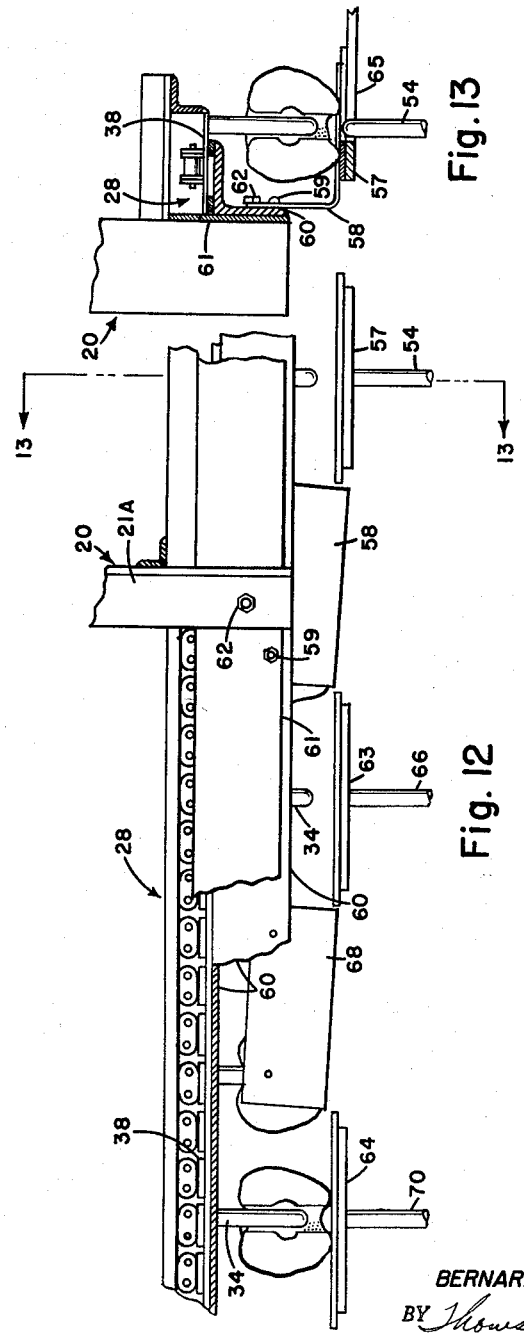

United States Patent Office 3,173,463
Patented Mar. 16, 1965

3,173,463
METHOD OF PROCESSING APPLES
Bernard Woodward, Jr., Rochester, N.Y., assignor to F. B. Pease Company, Rochester, N.Y., a corporation of New York
Original application Aug. 12, 1960, Ser. No. 49,187, now Patent No. 3,134,415, dated May 26, 1964. Divided and this application Mar. 4, 1963, Ser. No. 262,614
3 Claims. (Cl. 146—241)

This invention relates to an improved method for processing apples and is a division of my co-pending application filed August 12, 1960, Serial No. 49,187, now Patent No. 3,134,415, one object of this invention being the provision of a more satisfactory method for processing apples.

Because of the large number of apples processed by the food industry for cooking, freezing, canning and related uses, it is desirable to have a machine which will automatically pare, core, and slice the apple with a minimum of manual handling of the apples during these processes. In order to process apples in a manner which will insure a finished product completely free of skin and without spoiled spots, it is necessary that there be an inspection of all apples sometime after the coring and paring processes have been accomplished. As used hereinafter it will be understood that the terms "paring," "pared," or the like shall be construed to have the broadest meaning within the definition of Webster's Dictionary, i.e., broadly any process of removing the skin of the apple. Following the inspection, it is necessary for the excess skin and spoiled spots of the apples, not removed by automatic paring, to be cut away from the apple manually. It is an object of my invention to provide method for minimizing handling thereof.

There are a number of hair-like sprouts commonly referred to as the calyx surrounding the core on apples at the end opposite the stem, that being the blossom or bottom end, which food processors are most anxious to have removed prior to cooking, because after cooking of the apples, these hair-like particles present an appearance simulating fly particles in the applesauce. During the automatic processing of apples as described above, it is difficult to discover the apples of which these hair-like particles have not been removed unless the apple is inspected while bottom end up. Therefore, it is a further object of my invention to provide a method which will orient the apples so that the bottom ends of the apples are up while being inspected, following the coring and paring of the apples.

It is also an object of my invention to provide for a controlled orientation of the apple during all phases of processing from the time the apple is fed into the machine until it is released by the slicer mechanism.

A further object of my invention is to provide a method which will minimize the number of personnel necessary to carry out the efficient high quality production of pared and cored apples.

A further object of this invention is to provide improved method for inspecting apples for separation of one's requiring additional trimming.

Other objects and advantages of this invention will be particularly set forth in the claims and will be apparent from the following description of this one embodiment of my invention when taken in connection with the accompanying drawings in which:

FIG. 9 is an enlarged fragmentary view of the coring mechanism of the unit shown in FIG. 5 as seen from the side opposite to that shown in FIG. 5 illustrating the coring blade of the coring mechanism in different positions by the use of solid and broken lines;

FIG. 10 is a fragmentary right hand elevational view of a portion of the coring mechanism shown in FIG. 9;

FIG. 11 is a view of the retaining mechanism and the ejector mechanism of the unit shown in FIG. 5 as seen from the side opposite to that shown in FIG. 5;

FIG. 12 is an enlarged fragmentary cross-sectional view showing a portion of the apple conveying mechanism and several component parts of the slicer machine; and FIG. 13 is a cross-sectional view taken substantially along lines 13—13 of FIG. 12, looking in the direction indicated by the arrows.

Figure 1:
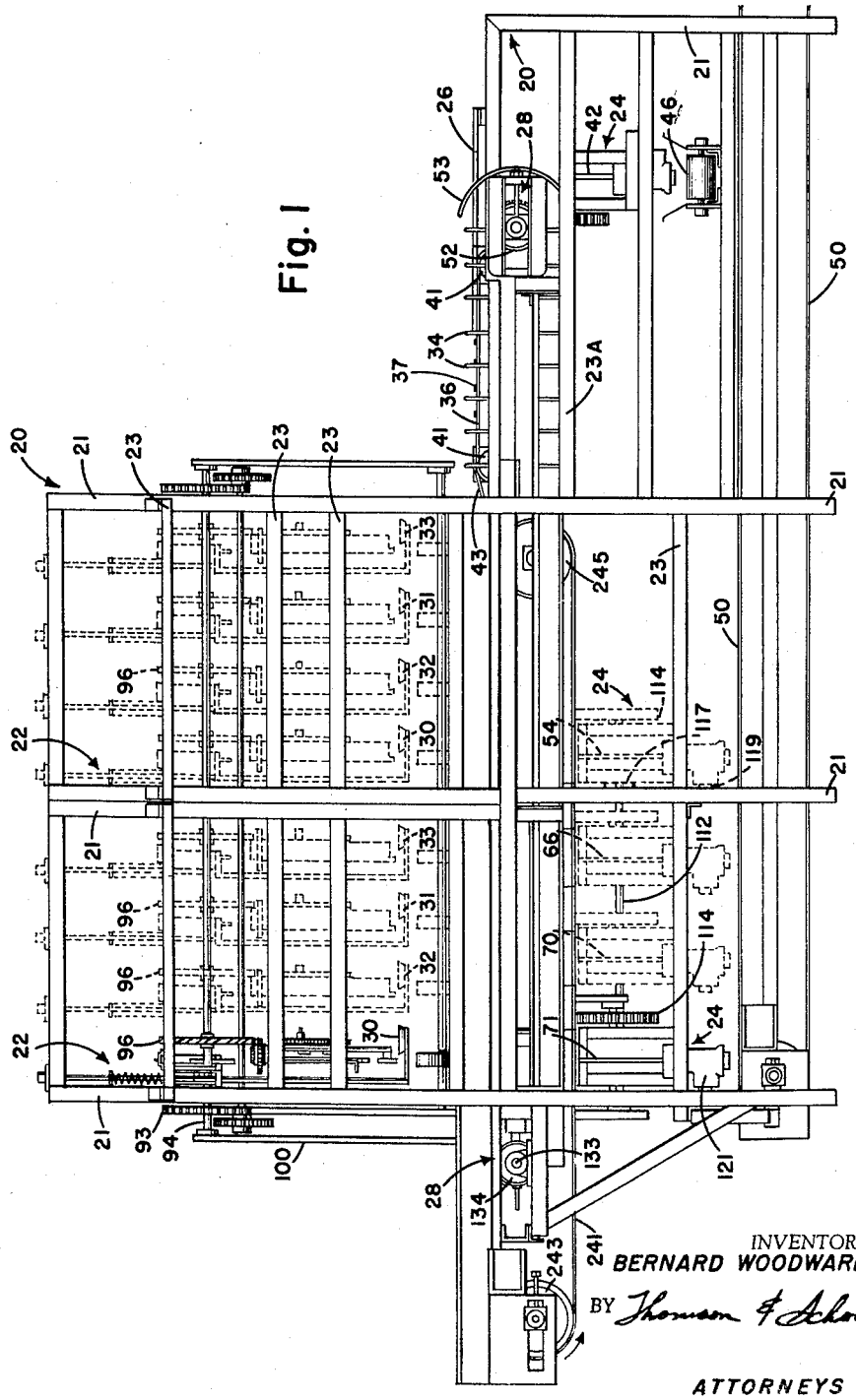
FIG. 1 is a front elevational view of an apple processing machine embodying the present invention.

Referring to FIG. 1, this embodiment of my invention preferably includes a frame generally indicated by the numeral 20 consisting of a plurality of vertical members 21 and a plurality of horizontal members 23, all welded or bolted together to form a rigid unit for supporting the component parts of this embodiment of my invention. The described embodiment mainly comprises eight peeling and coring machine units generally indicated by the numeral 22, four slicer machine units generally indicated by the numeral 24 mounted on the frame 20 directly below the eight paring and coring units 22, one slicer 24 located substantially to the right of the other four slicers and directly below a trimmer table generally indicated by the numeral 26 where spoiled areas of the apples and excess skin are trimmed from apples that are rejected by an inspector as they pass to the right with respect to FIG. 1 on a conveyor belt generally indicated by the numeral 28.

I have determined that substantially the maximum efficiency for an apple processing machine of the nature described here which would be readily marketable should include eight paring and coring machine units, in combination with four slicing machine units provided to slice the apples that are not rejected by the inspector and one slicing machine unit provided for slicing the rejected apples after trimming. With such a unit, only two operators are required for feeding 160 apples per minute into the eight paring and coring units, one inspector to check the pared and cored apples and reject those requiring additional trimming and from one to three trimmers, the norm being two. This means that the normal personnel requirement for this particular unit would be five. Previous machines of this general nature utilized four paring and coring machine units in combination with four slicing machine units and produced 80 pared, cored and sliced apples per minute or one-half the production of the described embodiment. The trimmer personnel of these old machines had to transfer all apples from the paring and coring units to two slicing units. The latter type of machines required one feeder and four trimmers for each four units, totaling five operators to operate a machine producing one-half the quantity of production of the described embodiment of my invention. Thus, my invention reduced the labor cost by one-half. This is an extensive saving to the apple processor who used my invention.

Figure 2:
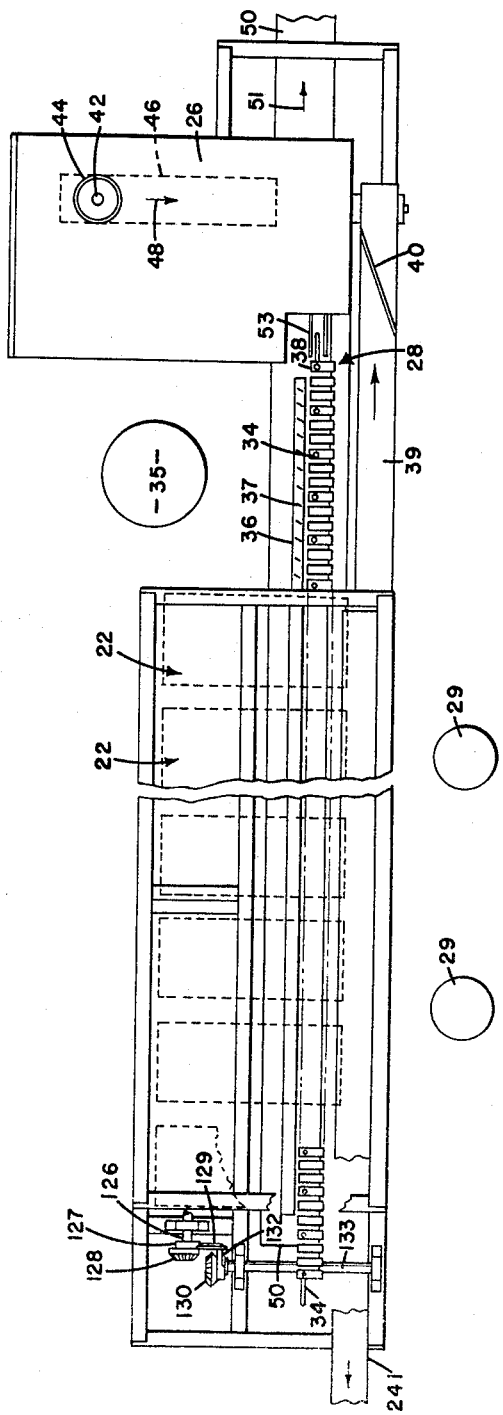
FIG. 2 is a top plan view of the machine shown in FIG. 1.

In operation, the apples to be processed are carried on a conveyor belt (not shown) between the frame 20 and the feeder operators standing in the positions indicated by the numeral 29 (FIG. 2). Each of the two feeder operators 29 supply apples to four paring and coring units. The feeder operators 29 remove the apples from the belt two at a time, and with one apple in each hand, they place the apples in alternate cups 30 and 31 (FIG. 1). After the apples have been positioned in the cups 30 and 31, these cups are pivoted backwardly and upwardly as viewed in FIG. 1 and the apples are inserted on a spindle or spiked apple holder 136 (FIG. 4), after which the apple is pared and cored as will hereinafter be described in detail. While cups 30 and 31 are being pivoted to the left and moved upwardly as viewed in FIG. 4, cups 32 and 33 are pivoting into the position shown in FIG. 1, so that the feeder operators 29 may then place an apple in each one of these two cups. Cups 32 and 33 are pivoted by means described hereinafter, in the same manner as cups 30 and 31, so that cups 32 and 33 are inserting apples on spindles 136 at the same time that cups 30 and 31 are pivoted into the position shown in FIG. 1. Thus, the feeder operators 29 placing apples in the cups can work almost continuously placing two at a time alternately in cups 30 and 31 and then 32 and 33. The linkage by which cups 30–33 are operatively effective to accomplish the pivotal action just described, will be recited in detail hereinafter under II. After the apple has been inserted on the spindle 136 it is pared and cored by operations hereinafter described in detail under II and III.

Referring to FIG. 2, after the apples have been pared and cored, they are deposited in an oriented position on pins 34 rigidly mounted on a conveyor system generally indicated by the numeral 28. The apples are then transported to the right as viewed in FIG. 1, past an inspector sitting or standing in the position designated by the circle 35 shown in FIG. 2. A belt 36 having a rough surface and a plurality of cleats 37 mounted diagonally thereon travels in an elevated parallel plane with respect to the conveyor system 28. The belt 36 engages two pulleys 41 around which the belt travels to the right as shown in FIG. 2 immediately adjacent conveyor belt 28. The pins 34, as will be noted in FIG. 2, are positioned on each segment 38 of conveyor 28 in a position close to the side adjacent belt 36. Pins 34 are positioned on segments 38 to permit the apples conveyed thereby to overhang each segment 38 and to be engaged by belt 36. As seen in FIG. 1, a small ramp 43 is provided to elevate the apple on the pin 34 to the level of belt 36 as it is being conveyed to the right. Belt 36 travels at a different rate of speed than conveyor 28 in order to rotate the apples continuously as they pass in front of the inspector at 35.

It is significant that the apples are placed in the cups 30–33 by the feeder operators 29 in an upright position with the stems extending upwardly; it is necessary that the apples be properly oriented when placed in the cups so that during the various processing phases they can be maintained in the same oriented position. After the apples are pared and cored, they are deposited on pins 34 in an inverted position by means hereinafter described under III and IV. One of the major reasons for orienting the apples is so they will be conveyed past the inspector at 35 in an inverted position. Apples have hair-like sprouts or fuzz surrounding the blossom end of the apple.

It is undesirable to permit any of this fuzz to get into the applesauce, sliced apples, or other form of processed apples, due to the fact that after cooking, these hair-like particles present an appearance simulating fly "specks" or fly particles. This makes the purchaser think that the final product has impurities in it. The orientation of the apple in an inverted position for inspection renders any apples not freed of this fuzz by the paring process more readily detectable by the inspector.

Most of the apples are conveyed by pins 34 directly from the paring and coring units past the inspector to the slicing units. However, there are some apples which do not pass inspection. The inspector removes any apples having any fuzz, spoiled spots, or skin thereon and places them on an endless belt 39 (FIG. 2) traveling to the right as indicated by the arrow in FIG. 2. A diagonally positioned bar 40 is provided to divert the apples traveling on the belt 39 onto the trimmer table 26 where they are picked up by one or more trimmers who remove the fuzz, spoiled spots, or skin not removed in the automatic paring process.

After the apples rejected by the inspector have been completely trimmed, they are each deposited on a shaft 42 projecting through a hole 44, cut in the trimmer table. The apple slides downwardly on shaft 42 (see FIG. 1) and passes through the slicer mechanism 24, after which it is deposited on a conveyor belt 46 and transported forwardly as indicated by an arrow 48 in FIG. 2. Belt 46 deposits the sliced apples onto a conveyor belt 50 traveling in a direction perpendicular to the course of travel of belt 46 as indicated by arrow 51. Belt 50 carries the sliced apples to a point of further processing, i.e., cooking or freezing.

Conveyor belt 28 continues to move the apples remaining on pins 34 to the right as viewed in FIG. 1 until it passes over pulley 52. As the belt moves around pulley 52, pins 34 move in a semi-circular path terminating in a depending position. The apples are prevented from falling off pins 34 by a pair of spaced arcuate guides 53 (FIG. 1) located on the right end of frame 20.

When the pins 34 reach a depending position, the apples transported thereon slide downwardly on the pins 34 until they engage a horizontally extending metal pan (not shown) being supported by cross member 23A (FIG. 1); this pan is vertically spaced from pins 34 only a limited amount to prevent the apples from falling off the pins 34 as they are transported by conveyor 28 (see FIG. 13).

A plurality of spaced slicing units 24 are located to the left of this pan (not shown) as shown in FIG. 1. Units 24 are provided with vertically oriented shafts 54, 66, 70 and 71 respectively. The driving means controlling the motion of the conveyor 28, to be described hereinafter in I, is arranged to stop the belt intermittently with pins 34 in alignment with these vertically extending shafts, as shown in FIG. 13.

When the driving means stops the conveyor 28, retractable slides 57, 63 and 64 and a corresponding one (not shown) located above shaft 71 are then withdrawn, thereby permitting the apples to slide off pins 34 and onto the aligned shafts 54, 66, 70 and 71 which guide the apples into the slicer.

Four slicing units 24 are provided, spaced three pitches apart, for purpose of this application, the word "pitch" refers to the distance between pins 34. The conveyor moves four pitches during each intermittent forward motion. Assuming, for purposes of explanation, that the first apple in line is stopped in alignment with shaft 54 and removed in the manner just described, then the apple on the next pin to the right of the first apple or the second apple will be advanced four pitches, of the pins 34, during the next motion of the conveyor 28 into vertical alignment with shaft 66 while the fifth apple will be advanced into a vertically aligned position with shaft 54. Then the second and fifth apples are removed in the manner described above. The next motion of the conveyor will move the third apple into vertical alignment with shaft 70, the sixth into alignment with shaft 66 and the ninth in alignment with shaft 54. Then the third, sixth and ninth apples are removed in the manner described above. The next motion will move the fourth apple in line into vertical alignment with the shaft 71, the seventh into alignment with shaft 70, the tenth into alignment with shaft 66, and the thirteenth into alignment with shaft 54. Thereafter, these last four apples are removed as described above. This operation continues to remove all apples from the pins 34.

This word description of how apples are transferred to shafts 54, 66, 70 and 71 is better illustrated below by the first ten apples in line being designated by the numerals 1-10 consecutively, and the consecutive stops of the conveyor 28 being designated by Roman numerals in the left-hand columns.

| Stops of Conveyor 28 | Shaft 71 | Shaft 70 | Shaft 66 | Shaft 54 |
| --- | --- | --- | --- | --- |
| I | | | | 1 |
| II | | | 2 | 5 |
| III | | 3 | 6 | 9 |
| IV | 4 | 7 | 10 | X |
| V | 8 | X | X | X |

It will be understood that the intermittent motion of conveyor 28 is coordinated with both the paring and coring units 22 and the slicer units 24 so that all apples will be deposited by the paring and coring units 22 on pins 34 and subsequently all apples will be transferred from pins 34 to shafts 54, 66, 70 and 71 and in turn deposited in the slicer units 24.

I will now describe the mechanics of how these apples are removed. The slide 57 (shown in cross-section in FIG. 13), has an apple-supporting area shown in section and the opening 65 through which the apple is permitted to slide off of pin 34. The slide 57 is located immediately above shaft 54 and supports the apples which are conveyed on pins 34 over shaft 54 during motion of conveyor 28; however, when conveyor 28 stops, the slide 57 is retracted from the position in which it supports apples and moved leftwardly as viewed in FIG. 13 to a position where the first apple in a series of apples is permitted to pass through the opening 65 onto shaft 54 channels the apple into the slicer mechanism 24 where it is sliced and/or chopped and deposited on the belt 50 (FIG. 1). Thereafter, the sliced apple is transported to the right on belt 50 as viewed in FIG. 1. After the first apple has dropped off of pin 34 onto the shaft 54, the slide 57 closes again.

The operation just described in connection with shaft 54 takes place simultaneously at shafts 54, 66, 70 and 71 to enable four apples to drop off of pins 34 each time the conveyor 28 stops.

After the slide 57 is closed to the position shown in FIG. 13, the conveyor 28 moves four pitches to the left as viewed in FIG. 12 and the second, third, and fourth apples are conveyed over a right-angular support 58 (FIG. 12), filling the space between slide 57 and slide 63. The second apple is stopped on slide 63 and the fifth apple is stopped on slide 57. Slides 57 and 63 are retracted and the second apple is transferred to shaft 66 and the fifth apple to shaft 54. While the conveyor 28 is not in motion, the third and fourth apples are resting on support 58. Two nuts and bolts 59 secure support 58 to a right-angular horizontal member 60 and a flat metal guide 61 which aligns the left hand side of conveyor 28 as viewed in FIG. 13. Member 60 and guide 61, in turn, are rigidly mounted to a vertical frame member 21A by a nut and bolt 62.

The third and fourth apples, supported on support 58 while the conveyor 28 is stopped, travel over slide 63 and another right-angular support 68 mounted to member 60 in the same manner as support 58 when the conveyor 28 is actuated again. After the conveyor 28 has moved four pitches, the third apple comes to rest on slide 64. The third apple is then transferred to shaft 70 in the same manner just described and the sixth and ninth apples are respectively transferred to shafts 66 and 54. A right-angular support (not shown), identical to supports 58 and 68, is provided between shafts 70 and 71 for supporting the apples conveyed by conveyor 28 past shaft 70 and transferred to shaft 71.

By the above operation, it is understood that all apples deposited on all eight cups 30-33 of the paring and coring machine units are pared, cored, trimmed, sliced and deposited on conveyor belt 50, by which they are carried to a point of further process.

Because of the complexity of the described embodiment of my invention, I have divided the description into five classifications.

I. Drive system
II. Paring apparatus
III. Coring apparatus
IV. Apparatus for maintaining apples in an oriented position prior to being transferred to a conveyor
V. Apparatus for transferring apples to conveyor pins The detailed description of the embodiment shown in the accompanying drawings will be described under one of the above recited classifications.

I. *Drive system*

Figure 3:
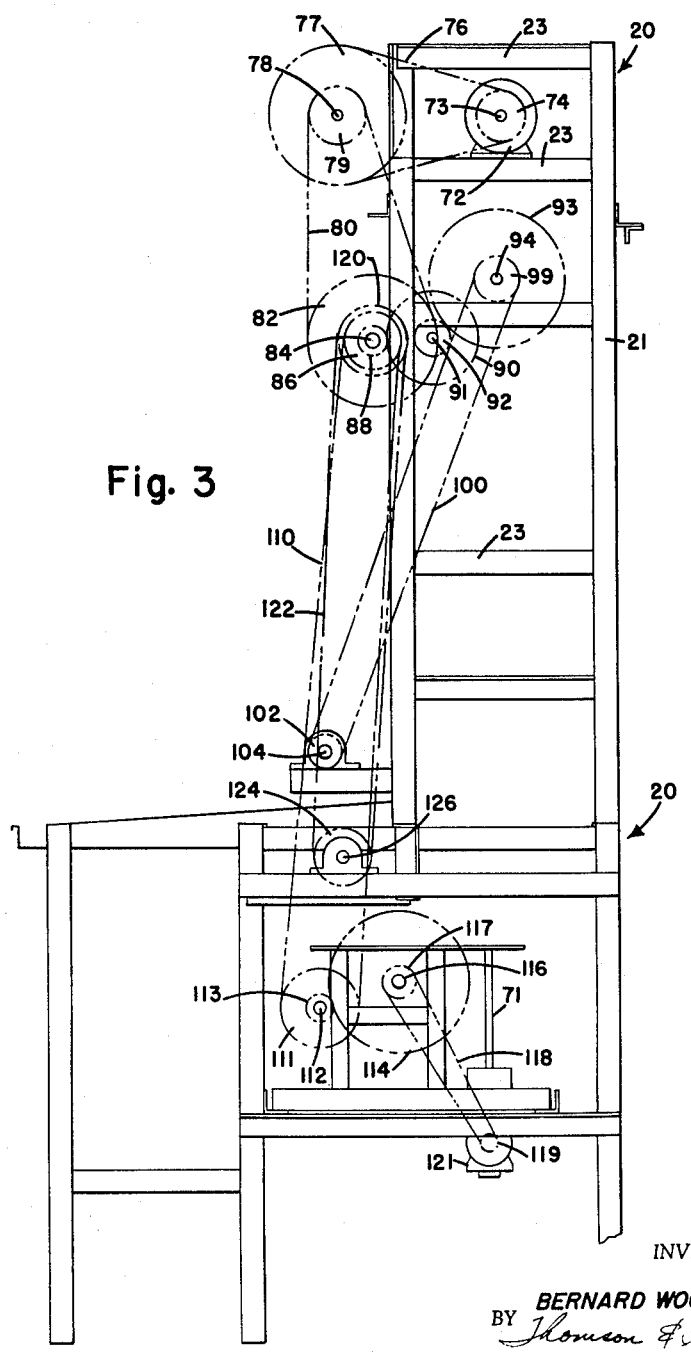
FIG. 3 is a diagrammatic side elevational view of the machine of FIG. 1 showing the drive mechanism for controlling the separate functions of this embodiment of my invention.

Referring to FIG. 3, a power source 72, preferably an electric motor, drives a shaft 73 on which is mounted a pulley 74, driving a V-belt 76, in turn driving a somewhat larger pulley 77. Pulley 77 is rigidly mounted on a shaft 78 pivotally mounted to the frame 20. A smaller pulley 79 rigidly mounted on shaft 78 drives a V-belt 80 which in turn drives a pulley 82 rigidly mounted on a drive shaft 84 having a sprocket 86 and a small gear 88 rigidly mounted thereon.

The gear 88 meshes with and drives a larger gear 90 rigidly mounted on a shaft 91, having a smaller gear 92 rigidly mounted thereon which meshes with and drives a large gear 93 rigidly mounted on a shaft 94. The combination of gears 88, 90, 92 and 93 reduces the speed of a shaft 94 in relationship to the speed of the shaft 84.

Referring to FIG. 1, the gear 93 and shaft 94 may be seen therein. Eight bevel gears 96, rigidly mounted on shaft 94 drive the eight paring and coring machine units 22. There are also eight cams 97 and eight cams 98 (see FIG. 4) rigidly mounted on shaft 94, one cam 97 and one cam 98 being provided for each of the eight paring and coring machine units. The function of these cams will hereinafter be described in detail under II.

Figure 4:
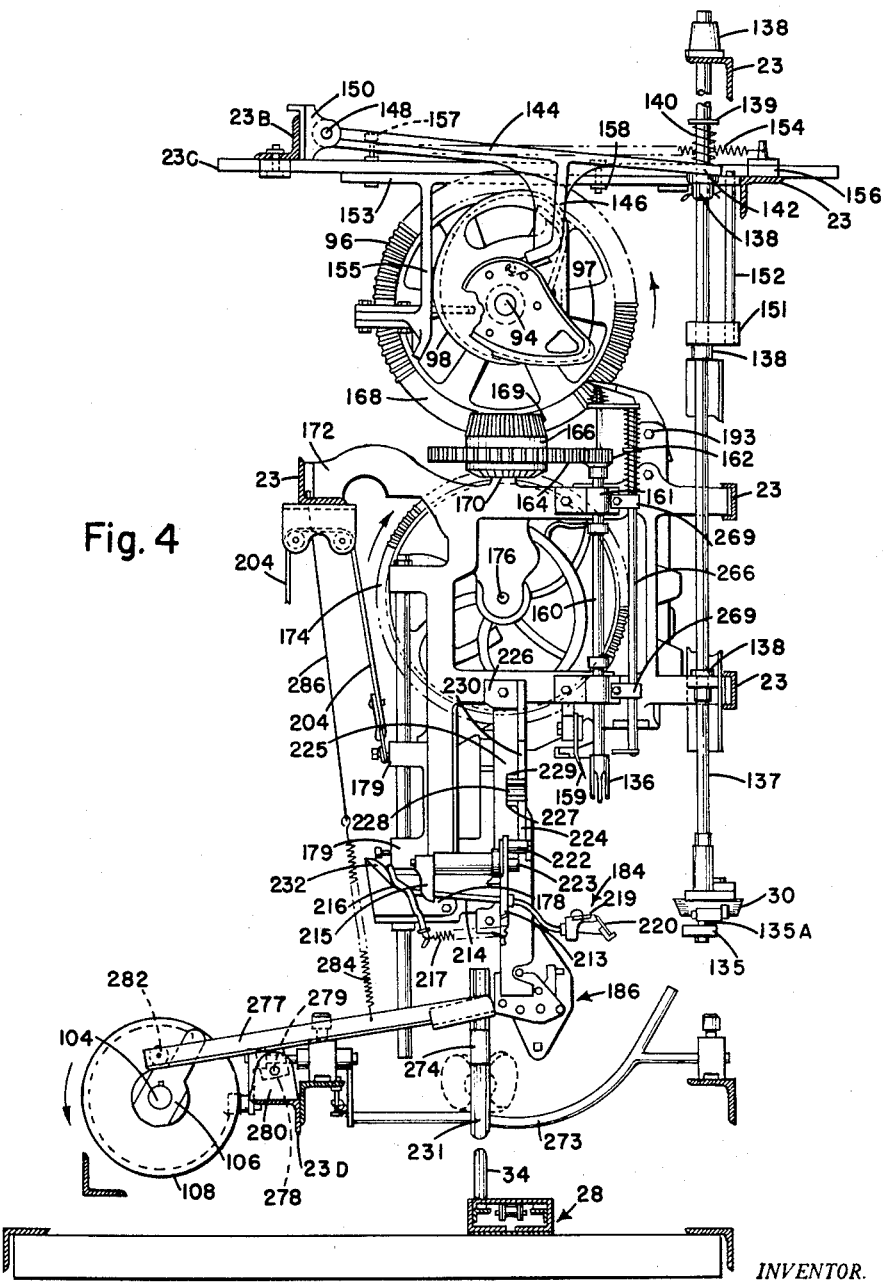
FIG. 4 is an enlarged fragmentary side elevational view of a paring and coring unit of my invention as seen from the left with respect to FIG. 1 with parts in section.

Referring to FIG. 3, a sprocket 99 rigidly mounted on shaft 94 drives a chain 100, in turn driving a sprocket 102, rigidly mounted on a shaft 104 rotatably mounted on frame 20. This shaft carries eight cams 106 and eight cams 108 (see FIG. 4), mounted in proper relationship to the units 22 as shown in FIG. 4. The purpose of cams 106 and 108 will be described in detail under IV and V.

Referring to FIG. 3, the sprocket 86 drives a chain 110 which in turn drives a sprocket 111 rigidly mounted on a drive shaft 112. Four small gears 113 rigidly mounted on shaft 112 mesh with and drive four larger gears 114, each of which is rigidly mounted on one of four shafts 116. Each gear 114 through each shaft 116 controls a slicer mechanism 24, not shown or described in detail because they are old per se. Four sprockets 117 rigidly mounted on shafts 116 drive four chains 118 which in turn drive four smaller sprockets 119, connected to gears mounted inside of a gear box 121. The gears (not shown) mounted inside of the box 121 control a device for celling apple seeds which is not described because it is old per se. Slides 57, 63 and 64 and the slide above shaft 71 are also controlled by the gears 114.

A sprocket 120 rigidly mounted on shaft 85 drives a chain 122 which in turn drives a sprocket 124 rigidly mounted on a shaft 126. Referring to FIG. 2, the shaft 126 continuously drives a gear 127, which has a tooth portion 128 and a vertical flat portion 129. Gear 127 controls the conveyor 28. Portion 128 is a semi-circular bevel gear having teeth extending 180 degrees around the circumference thereof, adapted to mesh with and drive a bevel gear 130 rigidly mounted on a shaft 133 which in turn drives a sprocket or pulley 134 (FIG. 1) rigidly mounted thereto. Pulley 134 (FIG. 1) engages and drives conveyor 28. Just before the bevel gear portion 128 is rotated free of the teeth of gear 130, an extension 132 rigidly connected to gear 130 is brought into registry with flat portion 129 of gear 127. The flat portion 129 of gear 127 is adapted to engage and pass vertically over a flat right end of extension 132 as illustrated in FIG. 2 while gear 127 is being rotated by shaft 126, thereby maintaining gear in a stationary position while gear 127 continues to turn. This merely serves to intermittently stop conveyor 28. It will be understood that any desired interrupter could be used. When flat portion 129 is disengaged from the flat right end of extension 132, the teeth of portion 128 of gear 127 once again mesh with the teeth of gear 130 to drive shaft 133, pulley 134 and conveyor 28.

It will be understood that the particular arrangement of pulleys, gears and cams described above may be varied to give any desired relationship of speeds, starting and stopping actions, and coordinated operations between the paring apparatus, coring apparatus, conveying apparatus and the slicing apparatus without departing from the spirit of my invention.

II. Paring apparatus

Referring to FIG. 4 when an apple is placed in the cup 30 by the feeder operator, it is centered by a pin or stud (not shown) located in the center of cup 30. The pin is controlled by a counterbalancing weight 135 positioned on the opposite end of a lever 135A from the pin. The cup 30 is simultaneously pivoted to the left and moved upwardly as viewed in FIG. 4 in order to impale the apple on a spiked holder or pronged retainer 136, having three depending prongs for supporting the apple after being impaled thereon. The upward movement of the cup is effected by means of cam 97 and cam 98 mounted on shaft 94 and two linkages controlled by cams 97 and 98. The cup 30 is rigidly connected to a shaft 137 which is aligned by means of a plurality of bushings 138 rigidly mounted on horizontal members 23 of frame 20. A retainer ring 139 rigidly mounted on shaft 137 rests on a compression spring 140 seated in a collar portion 142 of a follower-arm 144. Arm 144 has a downwardly extending follower member 146 adapted for engagement with cam 97. Follower arm 144 is pivotally mounted at 148 in a bracket 150 rigidly mounted on one of the horizontal members 23B of the frame. Cam 97 lifts arm 144 upwardly, and in turn, the spring 140 raises the ring 139, the shaft 137 and the cup 30. As the follower arm 144 makes its descent, responsive to the contour of the cam 97, the shaft 137 and cup 30 make a corresponding descent.

The pivotal movement of the cup 30 is accomplished by a second linkage comprising a collar 51 rigidly mounted on shaft 137, a vertically extending shaft 152 rigidly mounted in collar 151 and a follower arm 153 having a perpendicular extension 155 adapted for engaging cam 98 and having a hole adapted for receiving a downwardly extending shaft 152 pivotally mounted therein. The follower arm 153 is slidably mounted on a horizontal member 23C by throughbolts 157 and 158 in a manner permitting shaft 152 to be cammed to the left as viewed in FIG. 4 by cam 97. A tension spring 154, attached at one end to bolt 157 and at the other end to a projection 156 of member 23, opposes the action of cam 98 and thereby maintains extension 155 in an engaging position with cam 98. This second linkage pivots shaft 137 and cup 30 as the linkage controlled by cam 97 lifts shaft 137.

Cam 97 is designed so that at the high point of the cam, the apple will be inserted on the holder 136, a sufficient amount to be pierced by an angular knife 159 designed to cut the skin away from the indented portion of the apple surrounding the stem when the apple is rotated on the holder 136.

The motion of 136, upon which the apple is impaled, is controlled by gear 96. Gear 96 also controls the paring and coring units as will be explained in detail hereinafter and under III.

Immediately after the apple is impaled on the holder 136, a spindle 160, on which the holder is rigidly mounted, is rotated by means of the gear 96. A paring blade 220 and a coring blade 231 are also simultaneously raised by means of gear 96 into an engaging position with the apple being rotated on holder 136. Thus, as the apple is rotated it is pared and cored respectively by blades 220 and 231.

The spindle 160 is rotatably mounted on a subframe 172 by bushings 161 and the spindle has a small gear 162 rigidly mounted thereon. Gear 162 is driven by a large gear 164 rigidly mounted on double bevel gear 166 which in turn is driven by gear 96 when the teeth thereon mesh with bevel teeth 169 and gear 166.

The gear 96 has a flat portion 168 not adapted to drive gear 166. This gearing arrangement provides a period during which the holder 136 is at rest. During each period, when the holder 136 is at rest, an apple is impaled on the holder 136 by the above described linkages.

After the flat portion 168 has passed teeth 169, the toothed portion of bevel gear 96 meshes with the teeth 196 and drives gear 166 which in turn rotates spindle 160 by the above described gearing. Also, as double bevel gear 166 is rotated, a lower set of bevel teeth 170 thereon mesh with the teeth of a larger diameter bevel gear 174. Double bevel gear 166 and bevel gear 174 are rotatably mounted on sub-frame 172 which is rigidly mounted on a horizontal cross member 23 of the main frame and bevel gear 174 rotates on shaft 176.

Figure 5:
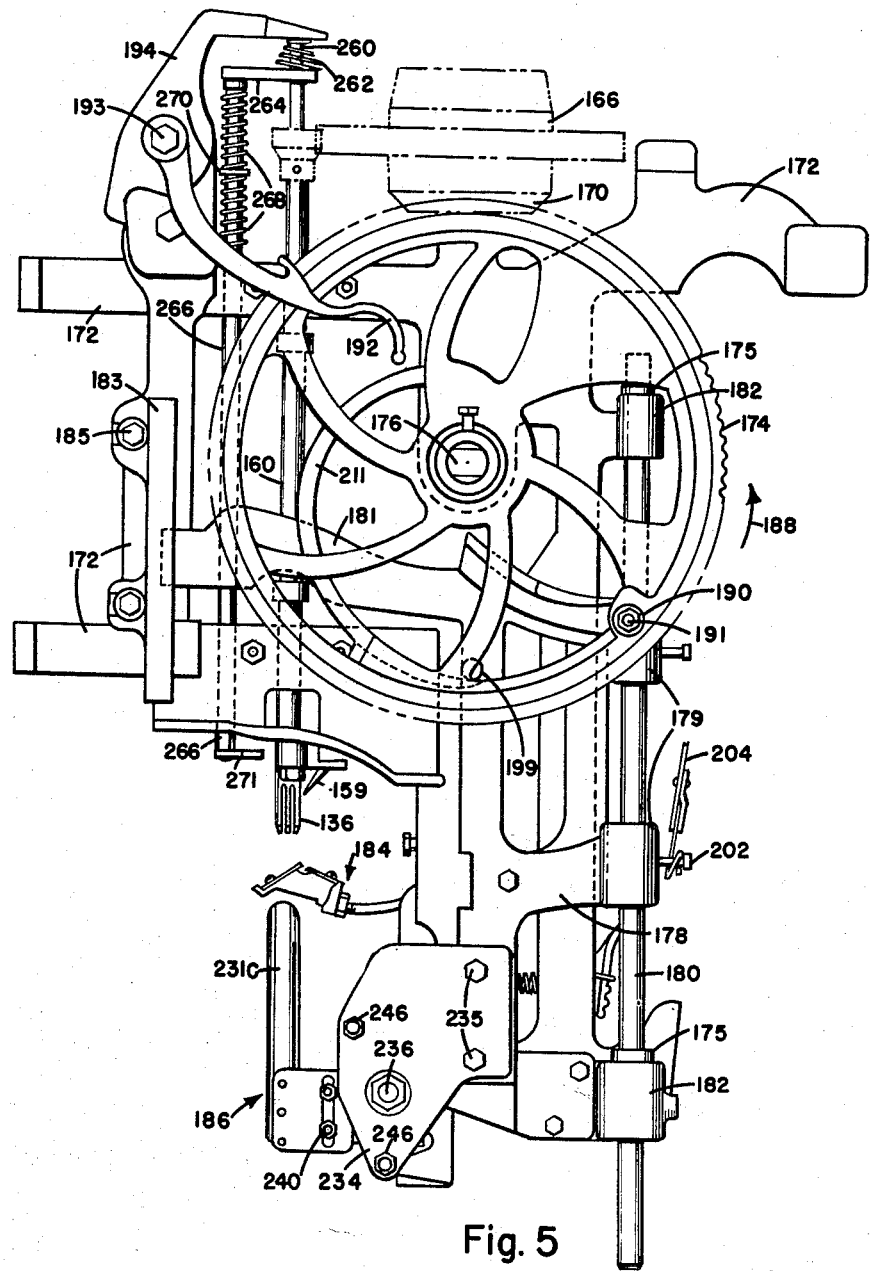
FIG. 5 is a further enlarged fragmentary right hand side elevational view of the apparatus shown in FIG. 4.

Referring to FIG. 5, the gear 174 has camming members, hereinafter described, for raising and lowering a jack 178. Jack 178 has two collar portions 179 rigidly mounted on a shaft 180, which shaft is slidably mounted within two bushings 175 seated in two collar portions 182 of sub-frame 172. Jack 178 also has an extension 181 slidable within a track 183 rigidly mounted by means of bolts 185 to the sub-frame 172. Thus is provided a means for aligning the jack 178 as it is cammed upwardly and downwardly by gear 174. Jack 178 supports a paring mechanism generally indicated by the numeral 184, the function of which will hereinafter be described and a coring mechanism generally indicated by the numeral 186, the function of which will be described under III.

The gear 174 performs two functions. First, it controls the jack 178 and second, it controls an ejector mechanism for ejecting the apple and core from holder 136. FIG. 5 illustrates the means by which the gear 174 controls the ejector mechanism. Referring to FIG. 5, teeth 170 of gear 166 drive gear 174 in a counterclockwise direction as indicated by the arrow 188. The gear 174 has a roller 190 projecting perpendicular thereto and rotatably mounted on a bolt 191. As gear 174 is driven in the direction indicated by the arrow 188, the roller 190 is adapted to engage an arm 192 and pivot the arm 192 in a clockwise direction as viewed in FIG. 5, about a bolt 193 supported on sub-frame 172 (see FIG. 4). Arm 192 is keyed to a lever 194 so that lever 194 also pivots in a clockwise direction when arm 192 is engaged by roller 190. The lever 194 actuates the ejector mechanism for ejecting the pared apple and apple core from the holder 136 at the proper time. The operation of this mechanism will be described more in detail hereinafter.

Figure 6:
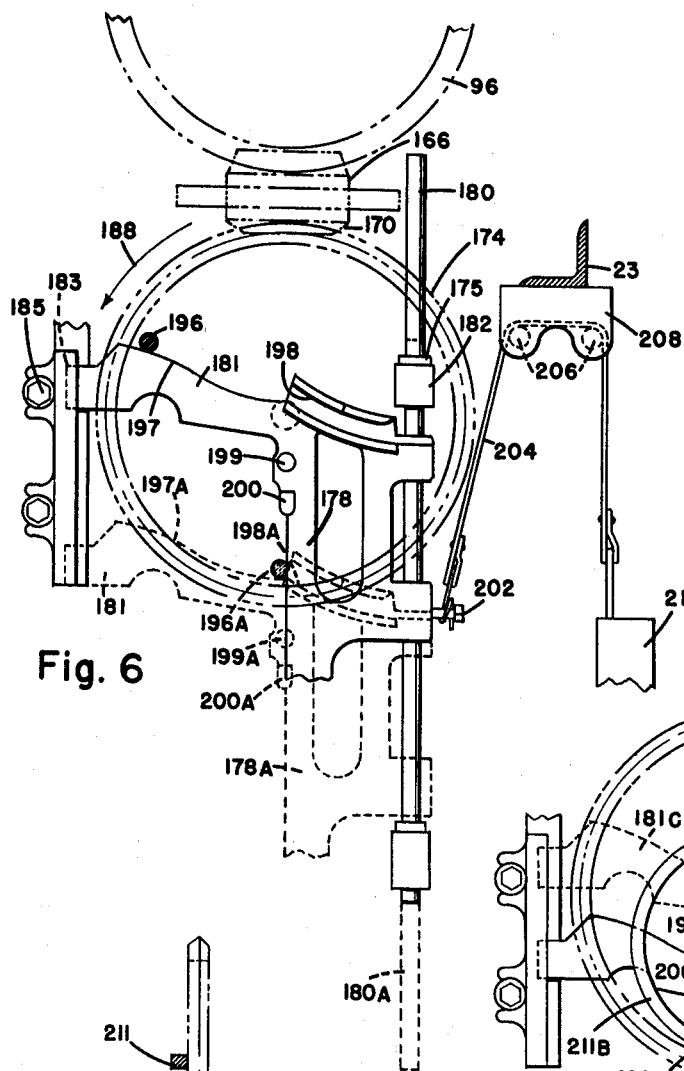
FIG. 6 is a view similar to that shown in FIG. 5 with parts broken away to illustrate the cam mechanism by which the paring and coring machine unit is controlled with broken line portions illustrating an intermediate position of the cam.
Figure 7:
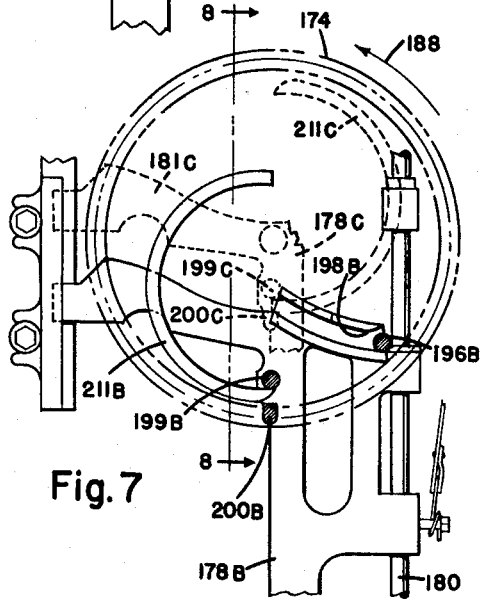
FIG. 7 is a view similar to FIG. 6 with different parts broken away to illustrate the cam mechanism in a second intermediate position wherein this broken line portion illustrates the cam in the position shown in solid lines in FIG. 6.
Figure 8:
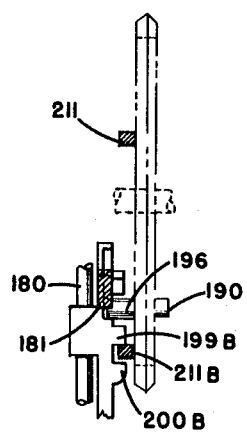
FIG. 8 is a fragmentary cross-sectional view taken substantially on the line 8—8 of FIG. 7 looking in the direction indicated by the arrows.

Schematic views of the camming functions of gear 174 for raising and lowering the jack 178 are shown in FIGS. 6, 7 and 8. The gear 174 has a stud 196 on the interior portion thereof which is positioned opposite the roller 190 (see FIG. 8); stud 196, shown in section in FIG. 6, is adapted to engage a cam surface 197 of extension 181 and a track or cam surface 198 of jack 178. In FIGS. 6, 7 and 8, we have used the same numeral followed by different letters to designate the same parts in different positions. In the position designated by the numeral 178A and shown in broken line in FIG. 6, the jack is at rest; this position is maintained while the flat portion gear 96 (FIG. 6) travels tangentially to teeth 169 of gear 166. During the rest period of jack 178 and gear 174, and 196 engages jack 178 at the upper mouth of track 198 as shown at 198A. The shaft 180 upon which jack 178 is mounted is shown in its lowermost or "rest" position at 180A. The jack has two studs 199 and 200, the combination of which serves as a track; the function of studs 199 and 200 will hereinafter be described. The collars 179 of jack 178 each have a strap support extension 202. A flexible strap 204 is, at one end, attached to one of the extensions 202 and passes over two idler rollers 206, pivotally mounted within a support frame 208 rigidly mounted on a horizontal member 23 of the frame 20. The end of the flexible strap 204 opposite where it is attached to extension 202 supports a counterbalance weight 210 greater in weight than the combined weights of the jack 178 and all parts supported thereby. The counterbalance weight 210 maintains the jack 178 in an engaging position with studs 196, 199 and 200 and thereby insures smoothness of operation during the raising and lowering of jack 178.

With reference to FIG. 6, as the teeth of bevel gear 96 engage the teeth 169 of gear 166 following the rest period of the jack, the teeth 170 likewise mesh with the teeth of gear 174 causing the stud 196A to engage track 198A and cam the jack 178A to the solid line position shown in FIG. 7. At this position, a cam portion 211B of gear 174 (partly visible in FIG. 5) makes contact at its lower surface with the stud 199; as gear 174 rotates counterclockwise, cam 211 passes between studs 199B and 200B. Referring to FIG. 8, this view shows the various parts including the studs 199B and 200B in the respective positions shown in solid lines in FIG. 7. Jack 178 is cammed upward by cam 211B from the position shown in solid lines and designated at 178B, FIG. 7, to the position shown in the broken lines and designated as 178C and shown in solid lines in FIG. 6. The broken line portion of FIG. 7 and solid line portion of FIG. 6, shows the jack at its uppermost position. At this uppermost position, the stud 196 has moved into an engaging position with the cam surface 197 of extension 181 of the jack. As gear 174 continues to revolve, the stud 196 cams the jack downwardly until the jack reaches the rest position shown in broken lines in FIG. 6 where the gear 174 is ready for another revolution and the jack ready to start another cycle.

Referring to FIG. 4, the raising of the jack 178 as described in conjunction with FIGS. 5, 6, 7 and 8, effectively controls the paring mechanism 184 for paring the apple while it is being rotated on the holder 136. The paring mechanism 184 is old per se so I will not describe more of it than is essential to understand its function.

The paring mechanism has a guide member 213 having a longitudinal slot (not shown) therein through which extends a cutter shaft 214. Shaft 214 is pivotally connected to a collar portion 215 of the jack 178, and shaft 214 has a substantially perpendicular extension 216 at the left end of the view of FIG. 4 adapted for engaging a stop 232 which is an extension of sub-frame 172. A tension spring 217 is attached at one end to the extension 216 and at the other end to guide member 213 to maintain the paring mechanism 184 in an engaging position with the apple during paring thereof and in opposition to a downward sliding motion of the cutter shaft 214 within the slot (not shown) of guide member 213 as viewed in FIG. 4.

A guide 219 adjustably mounted on shaft 214 is adapted for engaging the outer extremity of the apple and is maintained by spring 217 in an engaging position with the apple while the apple is being rotated on the holder 136. Thus, it will be understood that the combination of the spring 217 and guide 219 maintain a paring blade 220 at a uniform spaced distance from the contour of the apple during the paring thereof. Both the paring blade 220 and the guide 219 are adjustable to vary the cutting depth of the blade.

Now, I shall describe how this paring mechanism 184 is guided while paring the apple. A roller 222 is rotatably mounted on guide member 213. Member 213 also has two studs 223 shorter than roller 222 (only one of which studs is visible in FIG. 4) lying in a horizontal plane as viewed in FIG. 4 and shown at 60° to roller 222. A track 224 constituting the forward surface, as viewed in FIG. 4, of an extension 226 rigidly mounted to the sub-frame 172 provides a guide over which roller 222 travels as jack 178 is raised or lowered. The rearmost portion 225 of extension 226 provides a recessed track over which studs 223 slide as jack 178 is moved. When jack 178 is raised by the camming action of gear 174 described above, roller 222 travels vertically on track 224, and the stud 223 which is not visible in FIG. 4 slides over surface 225 until it engages an incline 227 (see FIG. 9), extending from surface 225 to track 224. The engagement of stud 223 with incline 227 and the engagement of roller 222 with a substantially semi-circular recess portion 228 of track 224 while the jack 178 is being raised causes the guide member 213, the shaft 214 and attached blade 220 to pivot counterclockwise in an arc of 90° as viewed from the left end with respect to FIG. 4. When the guide member 213 has been pivoted 90° to a horizontal position, the stud 223 which is visible in FIG. 4, engages an incline surface 229 (see FIG. 9). The engagement of this stud with incline 229 and the continued engagement of roller 222 (FIG. 4) with recess 228 while the jack 178 is being raised causes the guide member 213 and attachments to pivot an additional 90°.

The pivoting of the blade 220 in an arc of 180° while engaging the rotating apple, spirally pares the skin from substantially bottom end of the apple to substantially the top or stem end thereof. After the roller 222 reaches the uppermost end of recess 228, it passes over a flat vertical track 230 and the stud 223 visible in FIG. 4 engages surface 225. As the roller 222 passes over track 230, the paring mechanism 184 is withdrawn from an engaging position with the apple. After reaching the top of its upward stroke, the jack is cammed downwardly as described above with reference to FIGS. 6, 7 and 8 so that the paring mechanism 184 travels downwardly across track 230, recess 228, track 224 to its original position shown in FIG. 4.

As the paring mechanism 184 makes its downward stroke and just before reaching the lowermost position as shown in FIG. 4, the extension 216 engages a stop 232 which pivots the shaft 214 in opposition to spring 219 until it reaches the retracted position shown in FIG. 4.

The apple skin pared from the apples by the above described mechanism drops onto a conveyor belt 241 (FIGS. 1 and 2) which conveys the waste to the left, as viewed in FIGS. 1 and 2, to a disposal point. The belt 241 travels over two drum pulleys 243 and 245 (FIG. 1).

III. *Coring apparatus*

Referring to FIG. 4, as stated above, the coring mechanism 186 is attached to jack 178. The coring mechanism 186 is guided on camming surfaces of extension 226 to be described below. Extension 226 is rigidly mounted to sub-frame 172 by two bolts 233.

The following is a description of the apparatus for rotating a coring blade 231 in an arc of 180° to a vertical position and inserting the blade into the apple while it is being rotated on the holder 136 for coring the apple. Referring to FIG. 5, a back support plate 234, rigidly mounted on jack 178 by two bolts 235, has a stud 236 rigidly mounted thereon, which pivotally supports a stop member 237 (see FIGS. 9 and 10) and a coring blade support plate 238 which are rigidly mounted together. The coring blade 231 is rigidly mounted to plate 238 by two bolts 240.

Referring to FIG. 9, back support plate 234 is provided with two stop studs 242 and 244 rigidly mounted thereon by two nuts 246 (see FIGS. 5 and 10). Two follower studs 248 and 250 are rigidly mounted on plate 238 in the manner illustrated in FIG. 10. Studs 248 and 250 are identical in form, but for purposes of illustration, stud 248 is shown in FIG. 9 as a simple circle and stud 250 as a circle shaded by parallel horizontal lines. Referring to FIG. 10, a roller 251 rotatably mounted on plate 238 as illustrated, which is longer than studs 248 and 250, cooperates with these last mentioned studs to properly guide the coring blade 231 when the jack 178 is raised. For purposes of illustration in FIG. 9, roller 251 is designated by a circle shaded by parallel horizontal lines with a hexagon located in the center thereof free of shading. Multiple positions of the studs 248 and 250 and of the roller 251 are shown in FIG. 9 to illustrate the course of travel of each stud and of the roller while the jack 178 is being raised by the camming action of gear 174 described above. I have designated corresponding positions to the stud 248, stud 250 and roller 251 by their respective designating numerals and a progression of letter suffixes, corresponding letter suffixes indicate corresponding positions of the parts.

Referring to FIG. 9, extension 226 not only provides the tracks 224, 228 and 230 upon which the paring mechanism 184 is guided, but also provides the tracks or camming surfaces over which the coring mechanism 186 is guided. A small track portion 252 of extension 226, shown in broken line as viewed in FIG. 9, serves as a camming surface for stud 248 to engage initially on the ascent of jack 178. The roller 251 is guided over a recessed track portion 253 and track portion 254 of the right hand surface of extension 226. Stud 250 is guided over a recessed track 256 comprising approximately one-half the width of extension 226 as seen in FIG. 10.

In operation, when the jack 178 is at rest while the flat surface portion 168 (FIG. 4) of gear 96 is passing tangentially to and not engaging teeth 169 of gear 166 and an apple is being impaled on holder 136, the coring mechanism 186 (FIG. 9) is in the position shown in solid lines.

At the commencement of the ascent of jack 178 and coring mechanism 186, the blade 231 is free of the apple depicted by solid lines in FIG. 9. When the teeth of gear 96 (FIG. 4) mesh with teeth 169, the jack 178 raises the coring mechanism 186 (FIG. 9) and the stud 248 is lifted into an engaging position with track portion 252 and travels upwardly to the right thereon. The engagement of stud 248 with track 252 causes support plate 238 to pivot about stud 236 until roller 251 engages recessed track 253 in the position shown at 251A; at this position of the roller 251, the coring blade 231 is in a substantially horizontal position and the stud 250 is engaging the mouth of recessed track 256, which position of stud 250 is not shown. As the jack continues to raise the coring mechanism 186, roller 251 follows the contour of recess portion 253 of the track until it reaches the vertical track portion 254 at the position 251B and the stud 250 follows the contour of recessed track 256 until it reaches the position 250B; at this position, the coring blade 231 is in a substantially vertical position. After the stud 250 and roller 251 reach the "B" position, there is no further rotation about the stud 236. From the last mentioned position, the stud 250 and roller 251 travel vertically on tracks 256 and 254 respecitvely until they reach their uppermost position shown at 250C and 251C. At this "C" position, I have shown the entire core mechanism 186 in broken lines and have designated all of the parts of the core mechanism with numbers corresponding to those shown in the lower position followed by the suffix "C." Thus, the core mechanism is rotated 180° about the pivot stud 236. As indicated at the position 231C the coring blade is concentric with and partially surrounds the spiked holder 136.

Due to the close proximity of the blade at 231C with respect to the holder 136 which is rotating during the ascent of blade 231, it is important that the blade 231 be accurately maintained in the vertical position shown at 231C during the entire ascent thereof in order to prevent blade 231 from engaging holder 136. In order to insure this accuracy of guidance, the stop member 237 and two stop studs 242 and 244 on back support plate 234 have been provided. Stop member 237 has a sliding surface 257 (FIG. 10) engaging stop stud 242 when the coring mechanism 186 is in its lowermost position shown in FIGS. 9 and 10. The tubular portion of stop member 237 (FIG. 10) rotatably mounted on stud 236, is rigidly connected to pivot support plate 238; therefore, when the blade 231 has pivoted 180° and the stud 250 and roller 251 have reached the "B" position, a stop surface 255 (left side of stop member 237, FIG. 9) engages the lower stop stud 244, and sliding surface 257 engages a guiding surface 258 (see FIG. 10) rigidly mounted to the frame 20. The position 237C shows the stop member 237 in its uppermost position. Although for purposes of illustrating other parts more clearly in the "C" position, I have not shown guiding surface 258 in broken lines, it will be understood that surface 258 extends vertically a sufficient distance to maintain stop member 237 in a rigid vertical position between stop stud 244 and guiding surface 258 during ascent of coring mechanism 186.

In operation, the apple to be pared and cored is inserted on holder 136 by the linkage described in II until the stem end of the apple is positioned at substantially the point indicated by an arrow 259 (FIG. 9). The apple remains at this position while it is simultaneously pared and cored as described above. It is the rotation of the apple on holder 136, while the blade 231 is driven vertically through the apple, which severs a cylindrical core portion from the center of the apple.

After the apple has been pared and the core has been severed from the apple, the core is ejected from the pared apple and the apple is pushed further onto the blade 231. Referring to FIG. 5, the coring blade 231 simultaneously reaches the position shown at 231C as roller 190 engages arm 192 which is effective to rotate lever 194 in a clockwise direction with respect to FIG. 5. Lever 194 drives an ejector shaft 260 and a connector arm 264, slidably mounted on shaft 260, downwardly in opposition to a coil spring 262 surrounding shaft 260 and two tension springs 268 surrounding a pusher shaft 266. Springs 268 are separated by a ring 270. Ejector shaft 260 is slidably mounted inside a bore extending vertically through spindle 160, and pusher shaft 266 is slidably mounted in two bushings 269, both of which are rigidly mounted to sub-frame 172 (FIG. 4). The pusher shaft 266 (FIG. 5) has a pusher arm 271 rigidly mounted perpendicularly on the bottom end thereof.

The shaft 260 is driven downwardly through the center of spindle 160 and engages the severed core of the apple and drives it out through the bottom of blade 231. The discharged core drops onto conveyor belt 241 (FIG. 2) with the apple parings and is conveyed to a disposal point. By means of the above described linkage, the pusher arm 271 engages the top of the apple and is moved to the position 271A. The apple is thereby pushed to the position 272 shown in broken lines in FIG. 9. The significant reason for the operation of pushing the apple further onto the blade 231 will be described in IV. After the apple has been pushed to the position 272, the lever 192 has disengaged from roller 190 and the ejector shaft 260 and pusher shaft 266 are returned to their original positions shown in FIG. 5 by the coil springs 262 and 268.

The camming of the jack 172 from the solid line position shown in FIG. 6 down to the broken line position of FIG. 6 lowers the coring mechanism 186 and pivots the blade 231 downwardly about stud 236 to the depending solid line position of FIG. 9. When the apple arrives at this position it has been completely pared and cored ready for further processing.

It is significant that the blade 231 is locked in its lower vertical position shown in FIG. 9 by the stop member 237 engaging stop stud 242 and roller 251 engaging the lowermost portion of the vertical track 254 below the recessed portion 253. This insures proper alignment of the blade during removal of the apple as described under V. Moreover, it is important that in this lower position the blade 231 is cammed away from the path in which apple parings fall. This facilitates the separate conveyance of apple parings and pared apples.

IV. *Apparatus for maintaining apples in an oriented position prior to being transferred to a conveyor*

The primary means by which the apple is retained on blade 231, until the blade reaches the depending position shown on FIG. 4, is the frictional engagement of the apple with a circular portion 274 of blade 231. This is the significant reason for the operation of pusher arm 271 described in III and illustrated in FIG. 9. The pusher arm 271 pushes the apple onto circular portion 274 whereby the entire interior circumference of the cylindrical cored portion of the apple is frictionally engaged.

Many times, during the coring and paring process, apples are split and cannot be frictionally maintained on portion 274 of blade 231. Therefore, a rocker arm 273 has been provided as auxiliary means for preventing apples from being prematurely discharged from blade 231 while the blade makes its downward stroke described in III. Referring to FIG. 4, the rocker arm 273 has a selected curvature approximating the course of travel of the apple during the last 90° of downward motion of the blade to the position shown in FIG. 4. During the downward stroke of blade 231, the rocker arm 273 is maintained in a vertical plane in close proximity to the blade by the cam 108 in a manner described in V to prevent the apple from falling off the blade 231.

To carry forth the proper orientation of the apple, it is necessary to maintain the apple on blade 231 until a pin 34 of conveyor 28 stops, at a position directly below the blade, to receive the apple. The blade 231 and a pin 34 arrive in the same vertical plane simultaneously. Arm 273 is then pivoted out of the way by the camming action described in V to permit the transfer of the apple from the blade 231 to pin 34 by means described in V.

V. *Apparatus for transferring apples to conveyor pins*

Referring to FIG. 4, the apparatus for transferring apples to pins 34 of the conveyor system 28 includes the cam 108 effective to pivot rocker arm 273 clockwise as viewed from the left end of FIG. 4. This enables the apple to be transferred from blade 231 onto the pin 34 positioned directly below the blade. It will be understood that the pins 34 are positioned below blade 231 at the broken lines by interrupted motion of conveyor 28 described under I. The apple is then transferred onto pin 34 by an ejector arm 277 through the linkage described below.

The arm 277 has an extension 278 (shown in broken lines) pivotally mounted at 279 to a support member 280 rigidly mounted on a horizontal member 23D of the main frame 20. When a roller 282 rotatably mounted on ejector arm 277 is cammed upwardly by cam 106, arm 277 pivots about 279 in a clockwise direction with respect to FIG. 4 in opposition to a tension spring 284. Spring 284 is attached at one end to ejector arm 277 and at its other end to a rod 286 which is rigidly connected to sub-frame 172.

Now referring to FIG. 11, cams 106 and 108 rigidly mounted together and keyed to shaft 104 rotate in a clockwise direction as viewed in FIG. 11 and indicated by the arrow 288. Simultaneously, with the arrival of the coring blade 231 at the position shown in FIG. 11, the follower roller 290 by which the rocker arm 273 is controlled passes from a lower portion 291 of cam 108 to a higher portion 292 of cam 108, and the rocker arm is pivoted away from the blade. The roller 290 is rotatably mounted on an arm 294 keyed to shaft 296 which in turn is rigidly connected through an arm member 298 to rocker arm 273. The left end of arm 273, as viewed in FIG. 11, has an extension 299 rigidly mounted thereto in alignment with shaft 296. This extension is rotatably mounted in a bushing 300. Bushing 300 is mounted on a horizontal member 23E. Thus, the rocker arm 273 is pivoted in a counterclockwise direction as viewed from the left hand end of FIG. 11 in opposition to a tension spring 302. Simultaneously, as the roller 290 is cammed upwardly on the higher portion 292 of cam 108, the roller 282 controlling ejector arm 277 is also cammed upwardly on a portion 293 of cam 106 to actuate ejector arm 277 to push the apple off blade 231 and thereby transfer it to the pin 34 positioned directly below blade 231.

After the apple has been transferred from the blade onto pin 34, the roller 290 passes onto the low portion 291 of cam 108 and the rocker arm is returned to its normal vertical position shown in FIG. 11 by means of a spring 302 attached at one end to rocker arm 273 and at the other end and to a rod 304 rigidly connected to a horizontal member 23F. Immediately after the ejector arm 277 has transferred the apple onto pin 34, it is returned to its original position shown in FIG. 11 as a result of roller 282 being cammed downwardly by cam 106.

Once the apple has been transferred to pin 34, it is conveyed in the manner described above with reference to FIGS. 1 and 12 preceding numeral I. After the apple has been transferred to the pin 34, the teeth of gear 96 mesh with the teeth 169 of gear 166 to commence another upward stroke of the jack 178. Thus, is described one complete cycle of the operation of this embodiment of our invention.

This is a continuous process with apples being pared and cored alternately on every second paring and coring machine unit 22 in coordination with the interrupted motion of the conveyor 28 to provide a machine whereby a pared and cored apple is deposited on every pin 34 prior to passing the point of inspection 35 (see FIG. 2). The four slicer mechanisms 24 for receiving apples not rejected by the inspector and the four sliding mechanisms located above these four slicers are coordinated with the conveyor 28 whereby all the apples being conveyed on pins 34 are discharged into one of the four slicer mechanisms 24 prior to all pins passing to the left of shaft 71 (see FIG. 1).

Preferably, the entire machine is driven by a single power source which actuates all of the working parts of this embodiment of my invention through a series of gears, sprockets, chains, cams and follower rollers, in timed sequence to accomplish all of the objects of this invention.

It will be understood that the conveyor 28 could be eliminated and that each apple supported on a blade 231 be transferred directly onto one of the slicer shafts 54, 66, 70 or 71.

It will be further understood that many parts are adjustable to vary the timing of related parts.

While there has been shown and described the preferred forms of embodiments of my invention, it will be apparent that various changes and modifications may be made therein, particularly in the form and relation of parts without departing from the spirit of the invention as set forth in the appended claims.

I claim:
1. A method for processing apples, comprising the following steps, paring and coring an apple with the stem-end up, inverting each pared and cored apple, individually rotating each inverted apple about its core axis for inspection thereof, and separating apples requiring trimming from completely pared apples.

2. A method for processing apples, comprising the following steps, vertically paring and coring an apple with the stem-end up, inverting each pared and cored apple, individually rotating each inverted apple about its vertically axis while being conveyed past an inspection area for inspection thereof, and separating apples requiring trimming from completely pared apples.

3. A method for processing apples, comprising the following steps: paring and coring apples; inverting each pared and cored apple; individually rotating each inverted apple about its core axis for inspection thereof; and separating apples requiring trimming from completely pared apples.

References Cited in the file of this patent
UNITED STATES PATENTS

| | | |
|---|---|---|
| 1,358,061 | Davidson et al. | Nov. 9, 1920 |
| 1,493,364 | Massie | May 6, 1924 |
| 1,615,914 | Pease | Feb. 1, 1927 |
| 2,070,311 | Pease | Feb. 9, 1937 |
| 2,322,190 | Fleming | June 15, 1943 |
| 2,418,805 | Lindner | Apr. 8, 1947 |
| 2,639,799 | Pikal | May 26, 1953 |
| 2,991,881 | Craven | July 11, 1961 |